Aug. 16, 1927.                                          1,638,931
                    J. R. HOLCOMBE ET AL
                 APPARATUS FOR TILTING AUTOMOBILES
                    Filed July 19, 1926          2 Sheets-Sheet 1
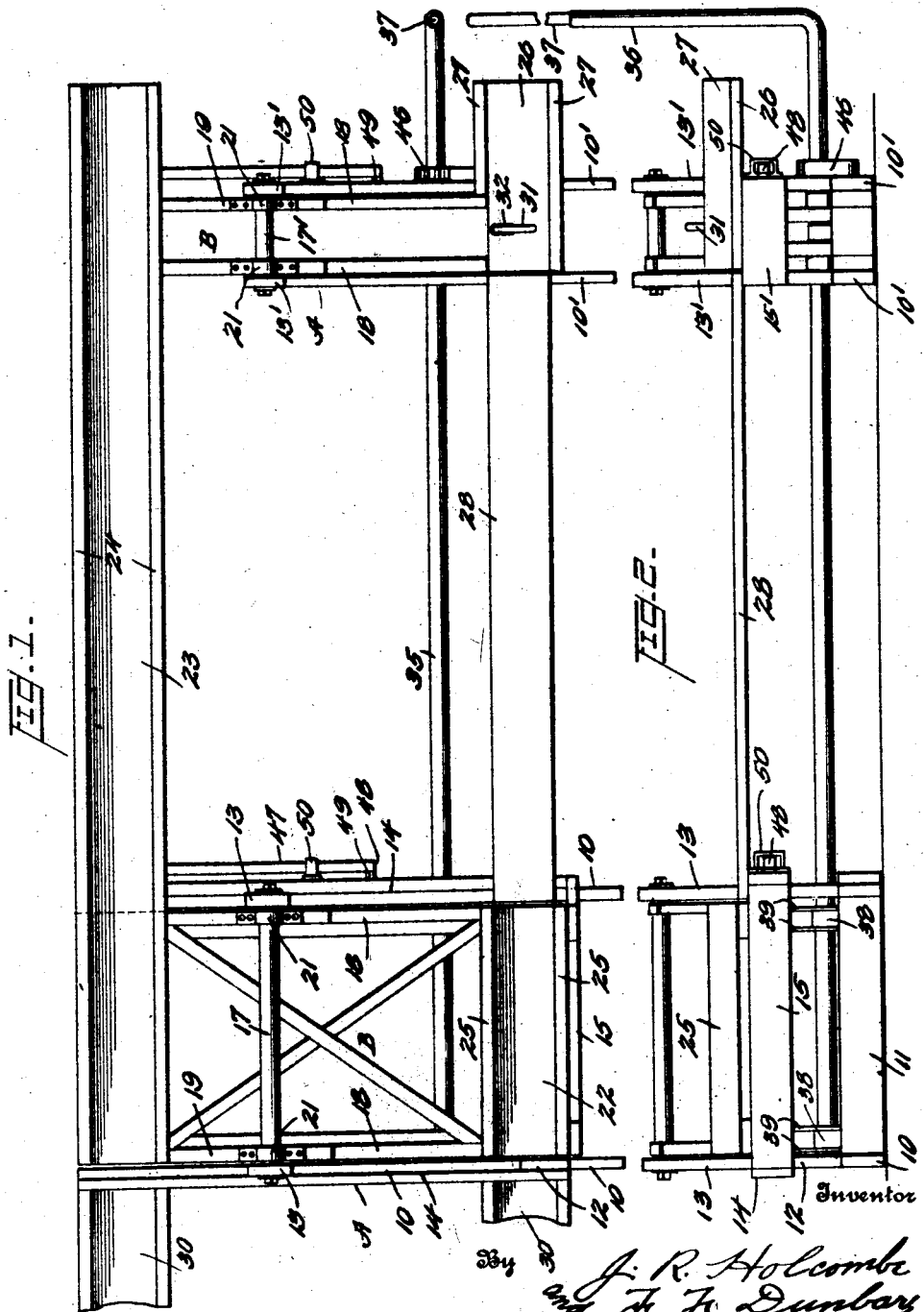

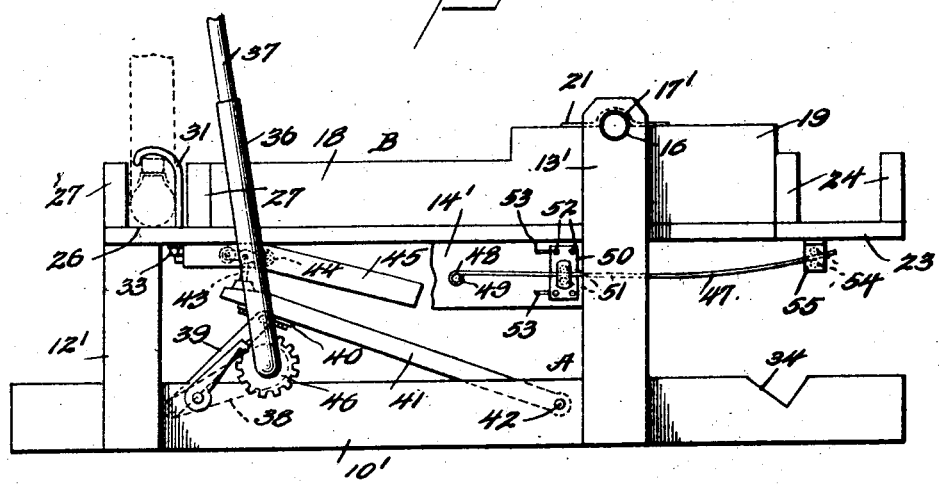
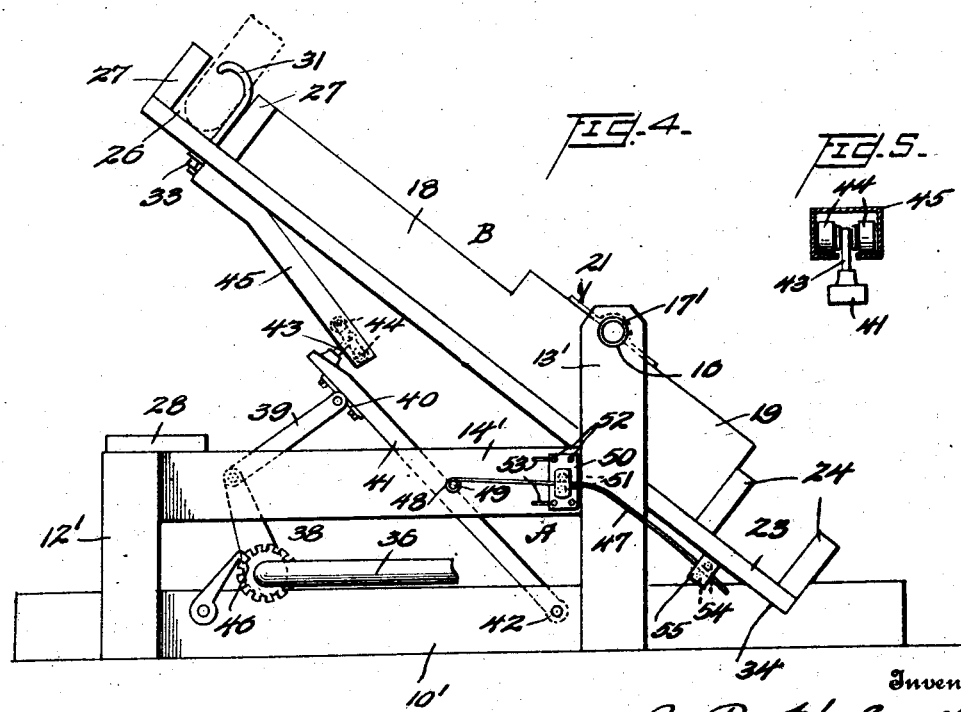
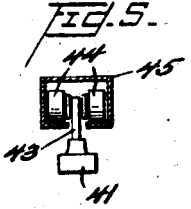

Patented Aug. 16, 1927.

1,638,931

UNITED STATES PATENT OFFICE.

JOLLY ROY HOLCOMBE, OF COLUMBIA, SOUTH CAROLINA, AND FRANCIS FICKLING DUNBAR, OF AUGUSTA, GEORGIA.

APPARATUS FOR TILTING AUTOMOBILES.

Application filed July 19, 1926. Serial No. 123,487.

This invention relates to apparatus for tilting automotive vehicles and more particularly to a cradle for receiving automotive vehicles and tilting the same about a longitudinal axis.

It is a general object of the present invention to provide a novel and improved form of vehicle cradle.

Another object of the present invention consists in the provision of a vehicle cradle adapted to tilt the vehicle about a longitudinal axis, means being provided whereby one of the runways for carrying a wheel of the vehicle from one end of the cradle to the other remains stationary during the tilting and serves as a bench for use by mechanics.

Still another object of the present invention consists in the provision of an apparatus of the type described comprising a stationary frame work and a vehicle receiving cradle bed, the latter being pivoted to the former in such a manner that the center of gravity of the vehicle is first raised and then lowered during the tilting operation, whereby less energy is required for the tilting.

A further object of the present invention consists in the provision of a device of the class described provided with a pair of separate cradle beds each pivoted to a stationary frame, together with a single operating means to simultaneously tilt the two beds throughout the same angle.

A still further object of the present invention consists in the provision, in a vehicle tilting cradle, of a stationary frame and a tiltable cradle bed, an adjustable spring means being arranged between these two parts to assist in the initial tilting and to resiliently restrain the cradle bed toward the end of its movement.

Another and further object of the invention consists in the provision of a tilting vehicle cradle comprising a stationary frame and a tiltable cradle bed, said bed being provided with a track engaged by a slide member, on the end of an arm pivoted to the frame, together with a toggle means for rotating the arm about its pivot.

Other and further objects of the invention will be more apparent to those skilled in the art after a consideration of the accompanying drawings and following specification wherein are disclosed a single exemplary embodiment of the invention with the understanding, however, that various changes may be made therein without departing from the spirit of the invention or the scope of the appended claims.

In said drawings:
Figure 1 is a plan view;
Figure 2 is a side elevation;
Figure 3 is an end elevation looking from the right in Fig. 1;
Figure 4 is a view similar to Fig. 3 showing the cradle bed in its tilted position; and
Figure 5 is a detail view showing the tracks and rollers.

It has been customary when lubricating and repairing automotive vehicles to provide some method or means for eliminating the tiresome and ineffective methods such as the use of a crawler wherein the mechanic must lie on his back and work on the lower parts of the machine. Resort has sometimes been had to the use of a pit of such a depth that the mechanic can stand up and work on the under parts of the vehicle, but such pits are costly, are non-portable, and still require work to be done over the head in a very awkward and tiresome manner. Elevated runways are sometimes substituted for the pits but they have substantially the same objections. The present invention contemplates the provision of a device whereby the vehicle may be conveniently tilted through an angle of approximately 45° bringing the lower portions thereof into view and enabling them to be worked on while the mechanic is in a normal seated postion on a convenient bench provided for that purpose.

Referring to the drawings, it will be seen that the device of the present invention comprises two main essential parts, the stationary frame portion A adapted to rest on the ground and the tiltable cradle bed portion B adapted to receive and retain in position an automotive vehicle. The part B is tiltable in respect to the part A and convenient means, to be later described, are provided to tilt the same.

The part A is composed of two framework sections, that at the left hand end as shown in Fig. 1 being composed of a pair of spaced lateral members 10 with their edges resting on the ground and connected together by longitudinal members such as 11. These parts and others to be later described may be formed of wood or of suitable structural steel shapes. The rectangle formed by the parts 10 and 11 has supported above it by the front corner posts 12 and the posts 13 in a rectangular framework having the side members or laterals 14 and longitudinal members 15 forming thus a rectangle equal in width but shorter than the base rectangle by reason of the posts 13 being materially inward from the rear of the bottom rectangle.

The right hand end of the framework is substantially identical with that disclosed at the left hand end, but the laterals 10' 10' are closer together. The corresponding parts on the right hand end have been numbered with primes.

The posts 13 13' at the rear of the upper rectangles extend considerably above these rectangles and are provided near their tops with transverse apertures 16 for the reception of the longitudinal pivot bars 17 17', which are securely fastened therein. These bars 17 17' are in axial alignment and serve as the axis about which the cradle bed B is adapted to tilt.

The cradle bed is in two main portions, one corresponding with the left hand framework and one with the right hand framework of the base. Each portion comprises a pair of transverse beam members 18 having the widened portions 19 notched as at 20 to receive one half the diameter of one of the pivots 17. Suitable straps 21 are bolted down to the parts 19 and pass over the tops of the pivots 17 to support the beams from the pivots. On the left hand side the cradle bed section has its beams 18 connected together at the front by a substantial runway plank 22 extending longitudinally of the device. At the rear a similar plank 23 connects the ends of the beams 18 and this plank extends across between the two cradle frames and is secured to the rear ends of the beams 18 on the right hand portion of the cradle bed. This plank 23 is provided with upstanding edges 24, not only serving to reinforce the same against bending under load, but forming therewith a channel to receive and guide the wheels of a vehicle. The plank 22, being only as long as the space between the outer faces of the beams 18 is likewise provided with upstanding vertical edges 25 forming a wheel receiving channel. The forward portion of the right hand cradle bed section is provided with a short plank 26 having the channel forming edges 27.

Between the parts 14 14' and in alignment with the planks 22 26 is supported a flat plank 28. It will be seen that the cradle bed portion thus comprises the channel like track 23 at the rear and a pair of channels 22 26 at the front connected together, when the cradle is in horizontal position, by the plank 28 so that a vehicle can be driven up the removable inclined guideways 30 with its wheels in the channels just described and stopped with one wheel resting on the plank 22 and one on the plank 26. The plank 28, it will be seen, thus acts only to carry one wheel across between the two planks 22 and 26 and may, if desired, be removed after the vehicle is in place. The two portions of the cradle bed are connected together by the plank 23 and it will be seen that the whole cradle bed is tiltable about the axis of the pivot 17 which is a material distance closer to the center of the plank 23 than to the center of the plank 22, so that when a vehicle is in position it is in stable equilibrium.

Any satisfactory manner of securing the vehicle wheels in the channels may be resorted to. It is preferred, however, to provide a hooked member 31, on the right hand cradle bed, which passes through a slot 32 in the plank 26 and is provided with a washer and nut 33 therebeneath, so that the hook may be passed over the felloe of the vehicle wheel and the nut tightened to securely clamp the wheel in the channel. It will be noted that the plank 26 is short and only of sufficient length to receive the wheel and assure its being properly clamped therein, whereas the plank 22 is of considerable length, to take care of various wheel bases. It is contemplated using a chain passing over the felloe of the wheel and around the plank 22 to retain a wheel in position thereon, although hooks similar to that in use in connection with the plank 26 may be used. It is not necessary to secure the wheels resting on the plank 23.

Referring to Figs. 3 and 4, it will be seen that the cradle bed may assume any position from the horizontal as in Fig. 3 to that shown in Fig. 4, wherein the plank 23 is received in notches 34 in the base members 10 and 10', thus forming stops. When the cradle bed is horizontal, a vertical line through the center of gravity of the vehicle passes to the left of the pivot 17', as viewed in Fig. 3, whereas when the cradle bed is tilted as shown in Fig. 4, a vertical line through the center of gravity of the vehicle passes to the right of the pivot 17'. Since the center of gravity of the vehicle is considerably above the axis 17', it must be lifted but little when tilting the cradle and, therefore, but little energy is necessary for this purpose.

The tilting mechanism is provided in triplicate, one element thereof being at the right hand end and one at either lateral of the frame at the left hand end. All of the tilting elements are controlled by a single longitudinal shaft or pipe 35 resting on the upper surfaces of the base members 10 10' and being secured thereon by suitable straps forming bearings. The right hand end of this shaft is bent at right angles as shown at 36 and may be provided with a suitable handle such as 37. The shaft 35 may well be formed of pipe, in which case the handle 37 may be removably fitted into the open end thereof. Since all of the tilting elements are the same, the following description will be limited to a single one, but will serve for all three. An arm 38 is non-rotatably secured to the shaft 35 and has pivoted to its outer end, and one on either side thereof, the links 39, which at their opposite ends are pivoted one on either side of the block 40 secured to the tilting arm 41 pivoted at its far end at 42 to the frame member 10'. The upper outer end of the arm 41 has adjustably secured thereto the yoke member 43 carrying the pair of rollers 44 adapted to slide in the track 45 secured to the under surface of one of the cradle bed sections. The rollers 44 are passed into the track 45, which is of rectangular section and slotted on the bottom, from the end, and cannot be removed except in that manner and are thus adapted to move the cradle bed either upwardly or downwardly.

Referring to Fig. 3, it will be seen that in the normal or horizontal position of the cradle bed the rollers are near the outer end of the track and that the links 39 and the arm 38 are close together. Upon a rotation of the handle 36 in a clockwise direction as indicated by the arrow, the four elements of the quadrilateral linkage composed of the arm 38, the links 39, the arm 41, and the portion of the frame 10' between the pivot 42 and the axis of the shaft 35, are caused to open up by the rotation of the shaft and the arm 38 simulating a toggle action. This arm pushes up on the links 39 and they rotate the arm 41 about its pivot 42. In turn, the rollers at the end of this arm push upwardly on the track 45 and lift the front side of the cradle bed until it reaches its limiting position as shown in Fig. 4. Upon the counter-clockwise rotation of the handle 36 the reverse operation takes place and the cradle bed is returned to its initial or horizontal position.

If desired, any suitable mechanism such as the ratchet and pawl device disclosed at 46 may be used to retain the cradle in any intermediate position, although it is not considered that such positions are necessary or desirable.

To assist the operator in lifting the vehicle until its center of gravity is vertically over the axle 17, a plurality of leaf-springs is provided, one for each section of the cradle. One of these is best seen in Figs. 3 and 4, and its description will satisfy for both. The spring 47 is a flat leaf-spring having at its left end the eye 48 through which is loosely passed a suitable securing bolt 49 to retain the left end in proper relation to the member 14' of the stationary framework. Also secured to this same member of the stationary framework is a flange 50 having projecting at right angles therefrom a pair of studs 51 sufficiently close together to engage one on either side of the spring to form what may be termed a cantilever pivot for the same. The flange 50 is adjustable longitudinally of the member 14' by means of the bolts 52 passing through slots 53. The outer end of the spring passes between rollers 54 secured to the plate 55 bolted to the under side of one of the cradle members. The initial set of the spring is such that when in the position shown in Fig. 3 it tends to partially tilt the cradle to thus be of assistance to the operator in performing the initial part of the tilt. However, after passing through a neutral point, the spring is flexed in the other direction by the tilting of the cradle bed until it assumes the position shown in Fig. 4 wherein it opposes the tilting of the bed, thus acting as a resilient stop to reduce shock upon the plank 23 stopping in the notch 34. The resilience of the spring may be adjusted by sliding the plate 50 in order to regulate the tension of the spring for different weights of vehicles.

The complete absence of any trackway between the lifted wheels when the cradle bed is tilted is of material assistance to those working on the vehicle for it gives a clearance and head room which could not be available otherwise. The plank 28 if left in position forms a convenient bench upon which mechanics may sit while working on the under side of the vehicle and forms a convenient repository for tools and parts. When the cradle bed is tilted, the full load of the vehicle is not retained on the pivots 17 but is partially supported directly from the ground through the members 10 10' by reason of the cradle side member resting in the notches 34. The linkage mechanism disclosed for tilting the cradle bed requires but little power to operate. In fact, it has been found that a vehicle weighing more than a ton and a half can readily be tilted by the application of an 18 inch Stillson wrench to the shaft 35. Since there is no reasonable limit to the length of the handle 36, it can be seen that the tilting may be made extremely easy. The initial position of the vehicle before tilting is not far removed from the ground. The whole device is extremely compact, being slightly less in length than the overall length of the vehicle and but slightly greater in width than the overall width of the vehicle. The majority of the parts are light and can readily be constructed of any desired material so that the cost will be relatively low.

Having thus described the invention, what is claimed and desired to be secured by Letters Patent is:

1. In an automobile cradle, in combination, a relatively stationary frame, a cradle bed pivoted for partial rotation in respect to said frame, an arm pivoted to said frame and having sliding engagement with said cradle, and toggle means to rotate said arm about its pivot.

2. In an automobile cradle, in combination, a relatively stationary frame, a cradle bed pivoted for partial rotation in respect to said frame, an arm pivoted at one end to said frame, a track secured to said cradle, means on the other end of said arm having sliding engagement with said track, a second arm pivoted for rotation on said frame, and means connecting said arms whereby rotation of said second arm rotates said first arm and tilts said cradle.

3. In an automobile cradle, in combination, a stationary frame, a cradle bed adapted to receive and hold a vehicle, said cradle bed being pivoted to said frame for partial rotation about a longitudinal axis, an arm pivoted to said framework and having an end in sliding engagement with said cradle bed, a second arm adapted for manual rotation and a link connecting said two arms.

4. In a vehicle cradle, in combination, a stationary frame, a cradle bed supported from said frame and tiltable about a longitudinal axis, a wheel channel at one side of said cradle, a pair of longitudinally spaced wheel channels at the other side and a runway connecting said spaced channels when the cradle bed is horizontal, said runway being supported directly by the stationary frame.

5. In a vehicle cradle, in combination, a stationary framework adapted to rest on the ground, pivots supported in said framework, a cradle bed supported by said pivots for tilting about a longitudinal axis, a continuous wheel channel extending along one side of said cradle bed, an interrupted wheel channel extending along the other side thereof, and a runway supported directly by said framework and connecting the parts of said interrupted channel when the cradle bed is in a horizontal position.

6. In a vehicle cradle, in combination, a stationary framework adapted to rest on the ground, pivots supported in said framework, a cradle bed supported from said pivots for tilting in one direction in respect to said framework, a continuous wheel channel extending along the side of said cradle bed which is lowered when tilting takes place, a pair of spaced wheel channels along the other side of said cradle and further removed from the axis of tilting than the first mentioned channel, a runway section on said stationary framework adapted to fill in between said spaced wheel channels when the cradle bed is in a horizontal position and means to tilt said cradle bed.

7. In a vehicle cradle, in combination, a stationary framework adapted to rest on the ground, pivots supported in said framework, a cradle bed supported from said pivots for tilting in one direction in respect to said framework, a continuous wheel channel extending along the side of said cradle bed which is lowered when tilting takes place, a pair of spaced wheel channels along the other side of said cradle and further removed from the axis of tilting than the first mentioned channel, a runway renewably supported on said framework and adapted to connect said pair of channels when the cradle bed is in a horizontal position and means to tilt said cradle bed.

8. In a vehicle cradle, in combination, a stationary framework, a cradle bed pivoted to said framework for tilting about a longitudinal axis, said cradle bed normally resting on said framework in a horizontal position, a spring between the stationary and movable parts, said spring being flexed in one direction when the cradle bed is horizontal and in the other direction when it is tilted to its limit.

9. In a vehicle cradle, in combination a stationary framework, a cradle bed pivoted to said framework for tilting about a longitudinal axis, said cradle bed normally resting on said framework in a horizontal position, a transverse member on said framework, a transverse member on said cradle bed, a leaf spring having a cantilever support on said first mentioned transverse member and means on said second mentioned transverse member slidably engaging the free end of said spring.

10. In a vehicle cradle, in combination, a stationary framework, a cradle bed pivoted to said framework for tilting about a longitudinal axis, said cradle bed normally resting on said framework in a horizontal position, a transverse member on said framework, a transverse member on said cradle bed, a leaf spring pivoted at one end to said first mentioned transverse member, a member adjustably secured to said transverse member and engaging the flat sides of said spring intermediate its ends and a member on said second transverse member having sliding engagement with said spring.

11. In a vehicle cradle, in combination, a stationary framework, a cradle bed pivoted to said framework for tilting about a longitudinal axis, said cradle bed normally resting on said framework in a horizontal position, a transverse member on said framework, a transverse member on said cradle bed, a leaf spring pivoted at one end to said first mentioned transverse member, a member adjustably secured to said transverse member and engaging the flat sides of said spring intermediate its ends and a member on said second transverse member having sliding engagement with said spring, said spring having its normal position intermediate the horizontal and full tilted positions of said cradle bed.

In testimony whereof we hereunto affix our signatures.

JOLLY ROY HOLCOMBE.
FRANCIS FICKLING DUNBAR.